R. S. SMITH.
ROLLER BEARING.
APPLICATION FILED APR. 21, 1915.

1,286,438.

Patented Dec. 3, 1918.
2 SHEETS—SHEET 1.

Witnesses:
Leonard W. Novander
Leonard E. Bogue

Inventor
Reuben Stanley Smith
By Lynn A. Williams
Attorney.

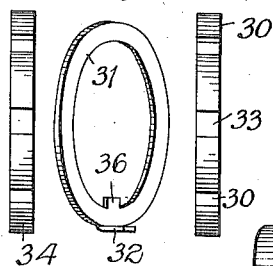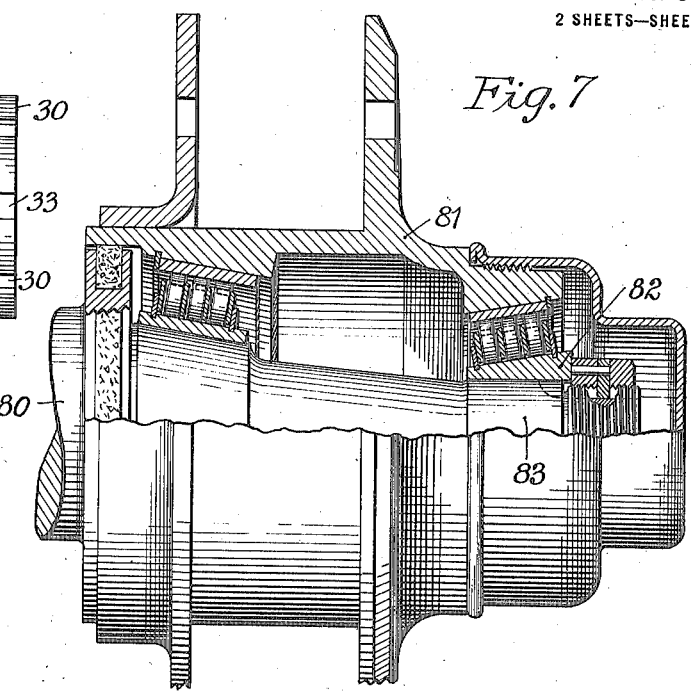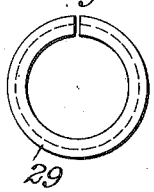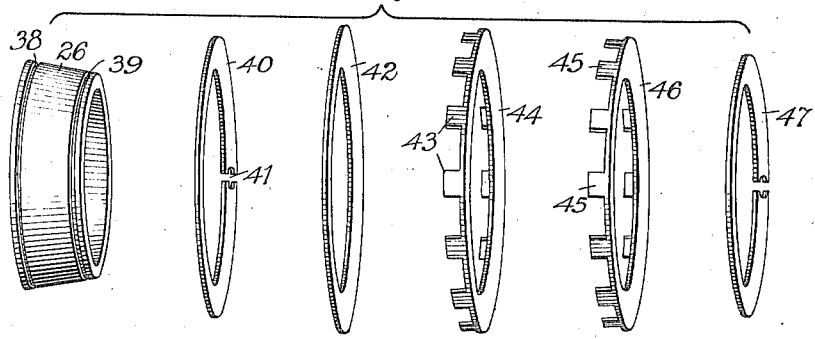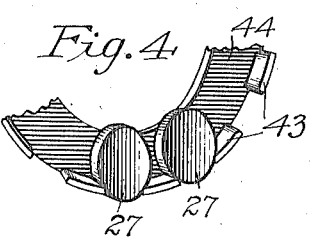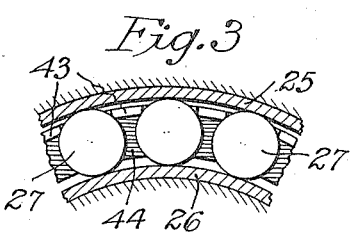

UNITED STATES PATENT OFFICE.

REUBEN STANLEY SMITH, OF MILWAUKEE, WISCONSIN, ASSIGNOR TO A. O. SMITH COMPANY, OF MILWAUKEE, WISCONSIN, A CORPORATION OF WISCONSIN.

ROLLER-BEARING.

1,286,438.  Specification of Letters Patent.  Patented Dec. 3, 1918.

Application filed April 21, 1915. Serial No. 22,769.

*To all whom it may concern:*

Be it known that I, REUBEN STANLEY SMITH, a citizen of the United States, residing at Milwaukee, in the county of Milwaukee and State of Wisconsin, have invented certain new and useful Improvements in Roller-Bearings, of which the following is a full, clear, concise, and exact description, reference being had to the accompanying drawings, forming a part of this specification.

My invention relates to bearings and particularly to the class commonly known as roller bearings.

One object of my invention is to provide inexpensive means for securing absolute parallelism between the opposing cone faces and also to cheapen the cost of production by providing means whereby the hardened cone surfaces or race members may each comprise a separate annulus of uniform thickness which may be slipped into position upon a previously formed conical hub or axle surface and in which absolute accuracy in positioning the race members is not required to insure parallelism and proper spacing between the inner and outer members.

Further objects of my invention are to provide a practically frictionless roller bearing which will withstand both radial and end thrusts and one which will be inexpensive to manufacture and maintain in service, also one which will show but slight wear due to friction, which can be adjusted to take up such wear as may occur, and which generally will give satisfactory service for an indefinite period of time.

My invention when applied, for example, to an automobile wheel comprises an axle, upon which is mounted a pair of oppositely and inwardly facing cones having hardened steel surfaces. Concentric with the axle, upon which these cones are thus mounted, is provided a hub, as, for example, the hub of an automobile wheel, and in this hub are mounted another pair of hardened cones, the surfaces of which are coaxial with and opposite to the surfaces of the cones mounted upon the axle.

Between the two sets of cones are mounted one or more sets of cylindrical rollers, the rollers of each set being mounted in independent cages, which cages are adapted to revolve in conformity with the bodily movement of the rollers which rotate therein.

While theoretically there must be some slip between the cylindrical rollers and the conical bearing surfaces upon which they travel, the elements of the rollers may be made so short as to make the slip absolutely negligible. Any given roller at the larger end of the conical bearing surfaces will not, however, revolve about the axis of the axle at the same rate as does a roller at the smaller end of the conical bearing surfaces. In accordance with my invention, therefore, I provide the set of rollers in each plane perpendicular to the axis of the bearing, with a separate cage, each of the cages being free to revolve about the axis independently of the other cages and the other rollers.

In accordance with my invention, the hardened steel roller races upon which the cylindrical rollers travel are of the same pitch both inside and outside and of the same pitch as the members upon which they are supported, which arrangement facilitates the machining of the parts and, notwithstanding inexpensive processes of manufacture, insures a proper fit between the parts. These, and the various other features of my invention, will be more clearly understood by reference to the accompanying drawings, in which—

Fig. 2 is a disassembled perspective view illustrating certain of the parts which confine the rollers to their positions;

Fig. 3 is a partial cross-sectional view illustrating the position of a cage and its rollers relative to the conical bearing surfaces;

Fig. 4 is a partial perspective view illustrating the relations of the rollers to their cage;

Fig. 5 is an end elevation showing a split conical bushing upon which one of the conical roller races is mounted;

Fig. 6 is a group showing the construction and arrangement of certain lock nuts and washers, and Fig. 7 is a view partly in elevation and partly in cross-section illustrating a modification adapted for use in the front wheel of an automobile, as compared with the construction shown in Fig. 1, which is more particularly adapted for use in connection with the rear wheels.

Figure 1:
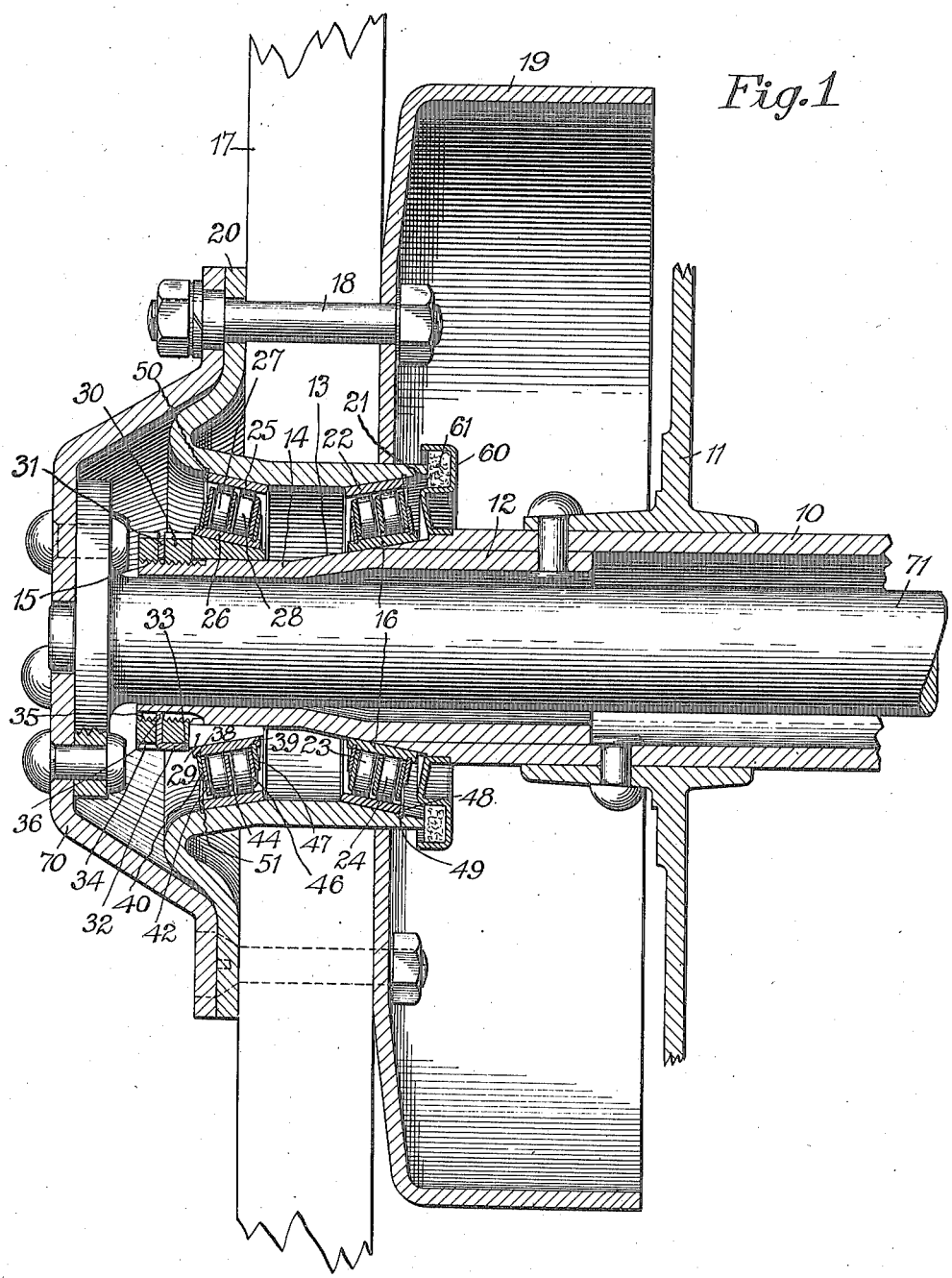
Figure 1 is a longitudinal cross-sectional view of one form of the bearing of my invention, shown in conjunction with certain parts of an automobile axle and wheel construction.

As best illustrated in Fig. 1, the weight of the automobile is carried by the hollow axle or axle housing 10, which in the drawings is shown as provided with a brake support arm 11 and with a bearing tube 12 of reduced diameter, all of these parts being fastened together, as shown, to have the effect of an integral construction.

The axle tube is provided with a tapered shoulder at 13 beyond which is a cylindrical portion 14 screw-threaded at the outer end, as indicated at 15. At 16 I have shown a hardened steel roller race ring, tapered inside to fit the tapered shoulder on the axle housing and finished outside with a conical surface having precisely the same pitch as the conical surface on the inside of the ring, the result being that the ring is of uniform thickness from end to end.

The spokes of the automobile wheel are indicated at 17, the bolts 18 serving to clamp the brake drum 19 to the spokes on the inside and serving also to clamp the wheel hub 20 to the spokes on the outside. The inside of the inner end of the hub is finished to form a conical surface having the same pitch as the conical surface of the shoulder of the axle tube. Fitting closely within the conical surface 21 at the inner end of the hub is an outer roller race member 22 of hardened steel, the inner surface and the outer surface of this roller race member being conical and of the same pitch as is the conical surface of the axle tube.

The rollers 23 are mounted, as shown, to take the pressure between the inner roller race member 16 and the outer roller race member 22, these rollers being held and guided in position by means hereinafter more fully described.

The outer end of the hub 20 is provided on the inside with a conical surface having the same pitch as the other conical surfaces heretofore referred to. Within this conical bore of the hub is mounted an outer roller race member 25. The outer end of the axle tube is provided also with an inner roller race member 26, these race members at the outer end of the bearing being preferably identical with those at the inner end of the bearing. Between these roller race members 25 and 26 at the outer end of the bearing are mounted hardened steel rollers 27 and 28, preferably identical with those illustrated at 23 and 24.

The inner roller race member 26 is supported from the axle tube by means of a split conical bushing 29, which bushing is slipped over the cylindrical extension of the axle tube, the longitudinal position of the bushing being determined by the pressure of a peripherally slotted adjusting nut 30 held against rotation by means of a keyed washer 31 provided with an ear 32 adapted to engage in a slot 33 in the periphery of the adjusting nut 30. The peripherally-slotted lock nut 34 is tightened against the washer 31 to prevent the adjusting nut from turning upon the threaded end 15 of the axle tube.

In Fig. 6 I have indicated at 36 a key on the washer 31 which key slips into the key way 35 at the end of the axle tube.

The details of the mechanism for holding the rollers in place can best be understood by reference to Figs. 2, 3 and 4. In Fig. 2, for example, one of the inner roller race members is shown at the right and is marked with the reference numeral 26. It will be noted that the outer surface of this conical roller race member contains two annular grooves or depressions, the one at the larger end being designated by the numeral 38 and the one at the smaller end being designated by the numeral 39. The slightly dished snap ring 40 slitted at one side as indicated at 41 is adapted to be snapped into the groove 38 at the larger end of the roller race member 26. Next in order of assembly is a slightly dished thrust ring 42 which is slipped over the smaller end of the roller race member 26 and then toward the larger end of the roller race member until it bears against the snap ring 40. A set of the hardened steel cylindrical rollers is then set in position between the spacer teeth 43, 43 of the roller cage 44, as best indicated in Figs. 3 and 4. The set of rollers thus mounted in the cage 44 may be slipped over the outer surface of the roller race member 26, where the rollers will be confined loosely between the thrust ring 42 and the face of the cage 44, at their ends, and between the bearing surface of the race member 26 and the teeth 43 of the cage 44 at their sides.

The next annular set of cylindrical rollers is similarly mounted between the teeth 45, 45 of the cage 46 and this cage, with its rollers, is slipped over the race member 26, as indicated in the assembly drawings. While in the present illustration of my invention I have shown but two annular sets of rollers, it will be apparent that the number may be increased indefinitely, as may be requisite to carry the load to be imposed upon the bearing.

When the last of the sets of rollers with their cage, has been slipped over the periphery of the conical roller race member 26, the slightly dished snap ring 47 is expanded and slipped over the smaller end of the race member 26 until it reaches its normal position in register with the annular groove 39 of the race member 26.

When the bearings are used in the rear axle assembly of an automobile, as illustrated in Fig. 1, for example, it is convenient as a first step to slip the roller race members 22 and 25 into the ends of the hub 20. The hub is provided with annular grooves 49 and 51 into which the split snap rings 48 and 50 are expanded to retain the conical roller race members 22 and 25 permanently in position within the hub, as shown in Fig. 1. In assembling a wheel upon the axle, the roller race member 16, with its associated rollers and retaining and guiding mechanism, is then slipped over the tapered shoulder 13 of the axle tube, after which the hub 20 is slipped over the axle to assume its final position, as shown in the drawing. The roller race member 26, with its associated rollers and cages, etc., is then slipped over the end of the axle tube and within the roller race member 25, as shown. The split conical bushing 29 is then slipped over the end of the axle tube and into the conical bore of the roller race member 26. The adjusting nut 30 is then screwed home, forcing the bushing 29 to the right until the lost motion between the rollers and the roller races is sufficiently taken up, the washer 31 and lock-nut 34 serving to maintain the parts in their proper relative positions.

A stamped sheet metal collar 60, with an annular groove filled with felt 61, is desirably mounted at or near the inner end of the conical shoulder of the axle housing to prevent the escape of oil, it being noted that the inner end of the hub extends within the annular cup in the collar 60.

In Fig. 1, which illustrates a bearing of my invention as applied to a rear axle assembly, I have shown a combined hub cap and driver 70, bolted as shown to the hub 20 of the wheel and attached by means of rivets to the end of the live axle 71, through which the power of the engine is transmitted to the wheel.

In Fig. 7, I have illustrated a bearing construction similar to that of Fig. 1, the axle 80 being designed for carrying a front wheel, the hub of which is indicated at 81.

As shown in the figure, the inner and outer bearings are of different sizes and are provided with three annular sets of rollers with their associated cages, etc. Aside from indicating such modifications as will readily be made in adapting the bearings of my invention to differing situations, Fig. 7 illustrates a roller race member 82 which has a cylindrical rather than a conical bore, this roller race member being supported directly upon the cylindrical end 83 of the axle 80.

In operation the automobile wheel with its hub rotates about the axle or axle tube, carrying with it the outer roller race members, the inner roller race members remaining fixed in position upon the axle or axle tube. If the rollers were infinitely thin disks they would roll upon the inner and outer roller races without any slip. Since, however, the rollers have a finite length, there will be, theoretically, some slip between some part of the surface of each roller and the surface of both the inner and outer roller race members upon which the roller rides. When, however, the rollers are made short in longitudinal dimension, as shown in the drawings, the theoretical slippage is so light as to be negligible, both in the matter of friction and in the matter of wear either upon the rollers or upon the conical surfaces of the roller race members.

The several sets of rollers, each set confined within its own cage, tend to revolve about the axis of the bearing at slightly differing angular rates and, if the sets of rollers are not free to rotate about the axis at different angular speeds, there is a tendency to bind and cramp the rollers, which tendency results in undue wear and friction. In the bearing of my invention, however, this tendency is wholly overcome by mounting the several sets of rollers each in its own independent cage, each cage with its associated rollers being free to revolve about the longitudinal axis of the bearing independently of all of the other cages with their sets of rollers.

The cages herein illustrated are of inexpensive but none the less effective construction. So also the roller races and the rollers are adapted for inexpensive manufacture. The fact that the conical surfaces of the roller race members and their supports at either end of the wheel hub are inwardly convergent, facilitates the assembling of the parts and serves also to minimize the cost of manufacture.

While I have herein shown and described a preferred embodiment of my invention with such modification as may be necessary in adapting it to use either in front or rear wheels of an automobile, it is to be understood that I do not wish to limit myself to these particular applications or uses nor to the precise details of construction herein particularly shown and described. On the contrary, the scope of my invention is to be gaged by the appended claims.

What I claim as new and desire to secure by Letters Patent is:

1. A roller bearing member including the combination with a conically tapered race ring of uniform thickness, of a one-piece split cone ring therein constituting a contractible conical wedge adapted to be bound upon an interior support, by the pressure of the race ring thereon.

2. A roller bearing member including the combination with a conically tapered race ring, of a spring split cone ring therein constituting a contractible conical wedge adapted to be bound upon an interior support, by the pressure of the race ring thereon, said race ring being non-expansible and of substantially uniform thickness.

3. An adjustable roller bearing comprising an outer member having a pair of oppositely facing frusto-conical surfaces of revolution with their smaller ends facing one another, an inner member having a non-adjustable frusto-conical surface of revolution parallel throughout with one of the surfaces of revolution of the outer member, a cylindrical surface on the inner member substantially opposite the other frusto-conical surface of the outer member, a split ring encircling the cylindrical surface of the inner member, the outer surface of said ring being conical, a sleeve encircling the outer surface of said split ring, said sleeve having an outer surface paralleling the inner surface of the last mentioned frusto-conical surface carried by the outer member, cylindrical rollers between inner frusto-conical surfaces of the outer member and the outer frusto-conical surfaces carried by the inner member, and means to move the split ring along the cylindrical surface of the inner member, whereby it will be caused to grip the cylindrical surface of the inner member, the pressure of the rollers on the sleeve surrounding said split ring serving as the abutment for said sleeve for forcing the sleeve onto the conical portion of said split ring member.

4. An adjustable roller bearing comprising a cylindrical inner member, a split ring surrounding the same, said split ring member having a conical external surface, a race member encircling said split ring and engaging its conical surface, an outer member, a race member carried thereby, rollers carried between the outer race member and the inner race member, and an adjusting nut for forcing the split ring lengthwise along the cylindrical inner member whereby the inner race member will be forced by its engaging rollers farther on to the conical split ring and the latter will be caused to more tightly grip the cylindrical inner member.

5. The combination with a cylindrical member, of a rotatable member surrounding said cylindrical member and provided with a conical bore concentric with and spaced from the surface of said cylindrical member, a conical race member of uniform thickness supported by the walls of said conical bore, a second conical race member surrounding said cylindrical member and spaced from said first-named race member, said second race member being of uniform thickness and having a bearing surface parallel with that of the first-named race member, means for adjusting said race members axially relative to each other, comprising a split conical ring supporting said second race member, and slidably mounted on said cylindrical member, and means for adjusting said ring longitudinally of said cylindrical member.

6. The combination with a cylindrical member, of a rotatable member surrounding said cylindrical member and provided with a conical bore concentric with and spaced from the surface of said cylindrical member, a conical race member of uniform thickness supported by the walls of said conical bore, a second conical race member surrounding said cylindrical member and spaced from said first-named race member, said second race member being of uniform thickness and having a bearing surface parallel with that of the first-named race member, means for adjusting said race members axially relative to each other, comprising a conical ring supporting said second race member, and slidably mounted on said cylindrical member, and means for adjusting said ring longitudinally of said cylindrical member.

7. The combination with a cylindrical member, of a rotatable member surrounding said cylindrical member and provided with a conical bore concentric with and spaced from the surface of said cylindrical member, a conical race member of uniform thickness supported by the walls of said conical bore, a second conical race member surrounding said cylindrical member and spaced from said first-named race member, said second race member being of uniform thickness and having a bearing surface parallel with that of the first-named race member, and means for adjusting said race members axially relative to each other.

8. The combination with a supporting member, of a rotatable member surrounding said supporting member and provided with a conical bore concentric with and spaced from the surface of said supporting member, a conical race member of uniform thickness supported by the walls of said conical bore, a second conical race member surrounding said supporting member and spaced from said first-named race member, said second race member being of uniform thickness and having a bearing surface parallel with that of the first-named race member, and means for adjusting said race members axially relative to each other.

9. The combination with a supporting member, of a rotatable member surrounding said supporting member and provided with a conical bore concentric with and spaced from the surface of said supporting member, a conical race member supported by the walls of said conical bore, a second conical race member surrounding said supporting member and spaced from said first-named race member, said second race member having a bearing surface parallel with that of the first-named race member, means for supporting said second member relatively to said supporting member and means for adjusting said supporting means relatively to said supporting member.

10. The combination with a split ring having a conical periphery and a cylindrical bore co-axial therewith, of a conical race member of uniform thickness surrounding said split ring and supported thereby.

11. The combination with a split ring having a conical periphery, of a conical race member of uniform thickness surrounding said split ring and supported thereby.

In witness whereof, I hereunto subscribe my name this 17th day of April, A. D. 1915.

REUBEN STANLEY SMITH.

Witnesses:
LEVERETT C. WHEELER,
IRMA D. BREMER.